(12) United States Patent
Ogawa

(10) Patent No.: US 7,859,784 B2
(45) Date of Patent: Dec. 28, 2010

(54) DATA STORAGE DEVICE AND ADJACENT TRACK REWRITE PROCESSING METHOD

(75) Inventor: Kenji Ogawa, Kawasaki (JP)

(73) Assignee: Toshiba Storage Device Corporation, Tokyo (JP)

(*) Notice: Subject to any disclaimer, the term of this patent is extended or adjusted under 35 U.S.C. 154(b) by 28 days.

(21) Appl. No.: 12/401,398

(22) Filed: Mar. 10, 2009

(65) Prior Publication Data

US 2009/0268336 A1   Oct. 29, 2009

(30) Foreign Application Priority Data

Apr. 28, 2008   (JP) .............................. 2008-116955

(51) Int. Cl.
*G11B 5/09*   (2006.01)
*G11B 5/596*   (2006.01)
*G11B 27/36*   (2006.01)

(52) U.S. Cl. .................. 360/53; 360/31; 360/77.02

(58) Field of Classification Search ............... None
See application file for complete search history.

(56) References Cited

U.S. PATENT DOCUMENTS 5,392,290 A * 2/1995 Brown et al. .................... 714/6

6,781,780 B1 * 8/2004 Codilian ....................... 360/60
7,215,497 B2 * 5/2007 Urata .......................... 360/53

FOREIGN PATENT DOCUMENTS

| JP | B2 3037250  | 2/2000 |
| JP | A 2001-14606 | 1/2001 |
| JP | B2 3942483  | 4/2007 |

* cited by examiner

*Primary Examiner*—Andrew L Sniezek
(74) *Attorney, Agent, or Firm*—Greer, Burns & Crain, Ltd.

(57) ABSTRACT

A data storage device, that stores write data by a head, rewrites data on an adjacent track at a timing which is different from write retry of detecting a head off track when data may be written to an adjacent track. When an off track error, which affects data on an adjacent track, is generated by a write command, rewrite processing of this write command is not executed immediately, but a rewrite request including information on the track to be rewritten and the shift amount of the off track is held. And the rewrite request being held is executed at a timing which is different from the write retry. So rewrite processing can be executed after vibration, which caused the off track, stops, and the generation of an off track error during rewrite processing and the generation of further off track writing can be prevented.

20 Claims, 12 Drawing Sheets

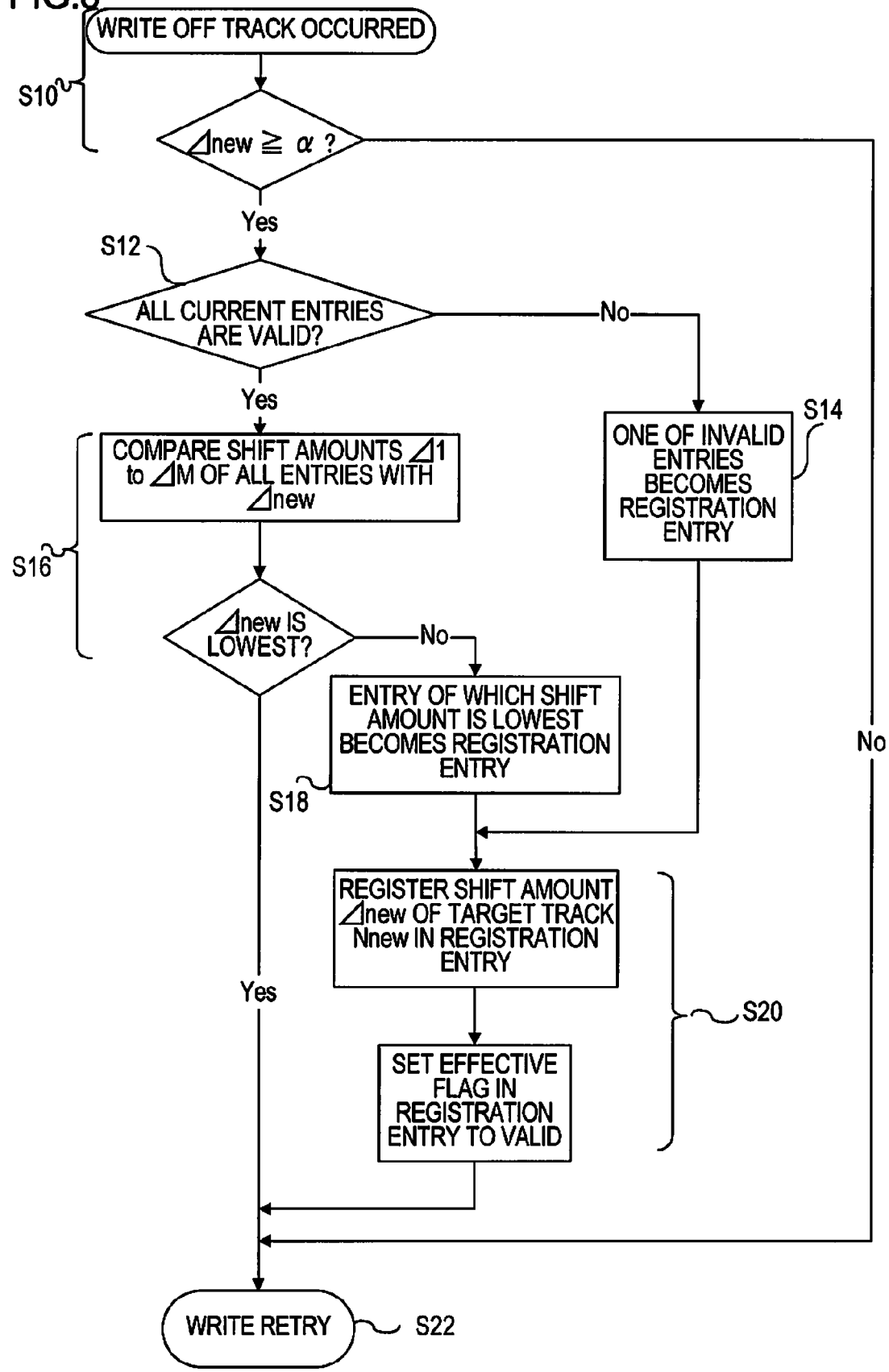

FIG.4

| ENTRY NO. | EFFECTIVE FLAG | TRACK NO. | SHIFT AMOUNT |
|---|---|---|---|
| 1 | VALID | N1 | $\Delta_1$ |
| 2 | VALID | N2 | $\Delta_2$ |
| 3 | INVALID | N3 | $\Delta_3$ |
| ⋮ | ⋮ | ⋮ | ⋮ |
| M | INVALID | NM | $\Delta_M$ |

| ENTRY NO. | EFFECTIVE FLAG | TRACK NO. | SHIFT AMOUNT |
|---|---|---|---|
| 1 | VALID | N1 | $\Delta_1$ |
| 2 | VALID | N2 | $\Delta_2$ |
| 3 | INVALID | N3 | $\Delta_3$ |
| ⋮ | ⋮ | ⋮ | ⋮ |
| M | INVALID | NM | $\Delta_M$ |

13-1

(OVERWRITE INVALID ENTRY) 

| ENTRY NO. | EFFECTIVE FLAG | TRACK NO. | SHIFT AMOUNT |
|---|---|---|---|
| 1 | VALID | N1 | $\Delta_1$ |
| 2 | VALID | N2 | $\Delta_2$ |
| 3 | VALID | Nnew | $\Delta_{new}$ |
| ⋮ | ⋮ | ⋮ | ⋮ |
| M | INVALID | NM | $\Delta_M$ |

| ENTRY NO. | EFFECTIVE FLAG | TRACK NO. | SHIFT AMOUNT |
|---|---|---|---|
| 1 | VALID | N1 | $\Delta_1$ |
| 2 | VALID | N2 | $\Delta_2$ |
| 3 | VALID | N3 | $\Delta_3$ |
| : | : | : | : |
| M | VALID | NM | $\Delta_M$ |

⇩

WHEN $\Delta_2$ IS LOWEST OF ALL, INCLUDING NEWLY REGISTERED $\Delta_{new}$ 13-2

| ENTRY NO. | EFFECTIVE FLAG | TRACK NO. | SHIFT AMOUNT |
|---|---|---|---|
| 1 | VALID | N1 | $\Delta_1$ |
| 2 | VALID | Nnew | $\Delta_{new}$ |
| 3 | VALID | N3 | $\Delta_3$ |
| : | : | : | : |
| M | VALID | NM | $\Delta_M$ |

FIG.9

| ENTRY NO. | EFFECTIVE FLAG | TRACK NO. | SHIFT AMOUNT | EXISTENCE OF CACHE DATA | POSITION OF CACHE DATA |
|---|---|---|---|---|---|
| 1 | VALID | N1 | Δ1 | YES | P1 |
| 2 | VALID | N2 | Δ2 | NO | P2 |
| 3 | INVALID | N3 | Δ3 | NO | P3 |
| .. | .. | .. | .. | .. | .. |
| M | INVALID | NM | ΔM | YES | PM |

| ENTRY NO. | EFFECTIVE FLAG | TRACK NO. | SHIFT AMOUNT | EXISTENCE OF CACHE DATA | POSITION OF CACHE DATA |
|---|---|---|---|---|---|
| 1 | VALID | N1 | Δ1 | YES | P1 |
| 2 | VALID | N2 | Δ2 | NO | P2 |
| 3 | INVALID | N3 | Δ3 | YES | P3 |
| .. | .. | .. | .. | .. | .. |
| M | INVALID | NM | ΔM | YES | PM |

13-1A

⇒

| ENTRY NO. | EFFECTIVE FLAG | TRACK NO. | SHIFT AMOUNT | EXISTENCE OF CACHE DATA | POSITION OF CACHE DATA |
|---|---|---|---|---|---|
| 1 | VALID | N1 | Δ1 | YES | P1 |
| 2 | VALID | N2 | Δ2 | NO | P2 |
| 3 | VALID | Nnew | Δnew | NO | Pnew |
| .. | .. | .. | .. | .. | .. |
| M | INVALID | NM | ΔM | YES | PM |

13-1A

| ENTRY NO. | EFFECTIVE FLAG | TRACK NO. | SHIFT AMOUNT | EXISTENCE OF CACHE DATA | POSITION OF CACHE DATA |
|---|---|---|---|---|---|
| 1 | VALID | N1 | Δ1 | YES | P1 |
| 2 | VALID | N2 | Δ2 | NO | P2 |
| 3 | INVALID | N3 | Δ3 | NO | P3 |
| .. | .. | .. | .. | .. | .. |
| M | INVALID | NM | ΔM | YES | PM |

| ENTRY NO. | EFFECTIVE FLAG | TRACK NO. | SHIFT AMOUNT | EXISTENCE OF CACHE DATA | POSITION OF CACHE DATA |
|---|---|---|---|---|---|
| 1 | VALID | N1 | Δ1 | YES | P1 |
| 2 | VALID | N2 | Δ2 | NO | P2 |
| 3 | VALID | Nnew | Δnew | YES | Pnew |
| .. | .. | .. | .. | .. | .. |
| M | INVALID | NM | ΔM | YES | PM |

DATA STORAGE DEVICE AND ADJACENT TRACK REWRITE PROCESSING METHOD

CROSS-REFERENCE TO RELATED APPLICATIONS

This application is based upon and claims the benefit of priority of the prior Japanese Patent Application No. 2008-116955, filed on Apr. 28, 2008, the entire contents of which are incorporated herein by reference.

FIELD

The embodiments discussed herein are related to a data storage device for storing write data from a host on a medium by a head, and an adjacent track rewrite processing method, and more particularly to a data storage device which rewrites write data on the adjacent track when off track is occurred during writing data on a medium, and an adjacent track rewrite processing method.

BACKGROUND

Because of the recent demand for computerized data processing, larger capacities are demanded for media storage devices for magnetic disk devices and optical disk devices for storing data. For this, the track density and recording density of disk media are constantly increasing.

In such a data storage device, a write error may occur when writing data to a disk because of an off track of the head. In other words, when data is written to a recording medium, a shift in the position of the write head from the center of the target track is detected, and when this shift amount exceeds a predetermined threshold, this writing is determined as an off track error, and write retry is executed.

If the shift amount of the head position is too large, it is possible that the write data was written in an adjacent track. Therefore in addition to the decision standard of an off track error, a decision standard on whether data may have been written on an adjacent track is set, so that the read and rewrite of the adjacent track are executed at the same time with the retry of this write command (data write on the track of the write command) (U.S. Pat. No. 3,942,483, U.S. Pat. No. 3,037,250 and Japanese Patent Application Laid-Open No. 2001-014606). In other words, in prior art, rewrite on the adjacent track is executed continuously after a retry of the write command.

Along with the recent improvement of recording densities of disk storage devices, track pitch is decreasing. This results in the off track of a head increasing. In particular, according to decrease of the track pitch decreases, the probability of off track caused by vibration increases.

When rewrite on an adjacent track is continuously executed after a retry of the write command as in the case of a prior art, the rewrite may be subject to vibration, which caused an off track error to this write command. In other words, elements which cause an off track error still exist during execution of the rewrite processing, and a worse case scenario is that more off track writing may occur.

Immediately executing rewrite processing also leads to an increase in the execution of the write command, and causes a drop in performance of the drive.

SUMMARY

According to an aspect of the embodiment, a data storage device including a head for reading and writing data on a rotating storage medium; an actuator for positioning the head on a desired track of the storage medium; a control circuit which receives a write command and write data from a host, writes the write data on a specified track of the storage medium using the head, detects off track that the head is shifted from the track, when the head is writing data on the track, and executes write retry of the write data on the track; and a rewrite request table for storing a rewrite request, in which when the off track is detected. The control circuit judges whether there is a possibility that data on an adjacent track is affected by off track of the head when detecting the off track, and if it is judged that there is a possibility that the data on the adjacent track is affected, the control circuit stores the rewrite request for the adjacent track in the rewrite request table, and executes the rewrite request stored in the rewrite request table at a timing which is different from the write retry.

According to another aspect of the embodiment, an adjacent track rewrite processing method for a data storage device according to the present embodiment, which positions a head for reading and writing data on a desired track of a rotating storage medium and reads and writes the data, having the steps of: detecting off track that the head is shifted from the track, when the head is writing data on the track; judging whether there is a possibility that data on an adjacent track is affected by off track of the head when the off track is detected; storing a rewrite request for the adjacent track in a rewrite request table if it is judged that there is a possibility that the data on the adjacent track is affected; executing write retry of the write data on the track; and executing the rewrite request stored in the rewrite request table at a timing which is different from the write retry.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a flow chart depicting a first embodiment of write retry processing;

FIG. 4 shows a rewrite processing request table in FIG. 1 and FIG. 3;

FIG. 5 shows a storing operation of rewrite request in FIG. 3 to the rewrite request table in FIG. 4;

FIG. 6 shows a storing operation of rewrite request in FIG. 3 when the rewrite request table in FIG. 4 is full;

FIG. 9 shows the rewrite request table in FIG. 1 and FIG. 8;

FIG. 10 shows the registration operation of a rewrite request registration processing in FIG. 8 to the rewrite request table in FIG. 9;

DESCRIPTION OF EMBODIMENTS

Hereinafter, preferred embodiments will be now explained in order to a data storage device and a first embodiment of rewrite processing, a second embodiment of rewriting process and other embodiments, however, the present invention is not restricted to these embodiments.

(Data Storage Device)

Figure 1:
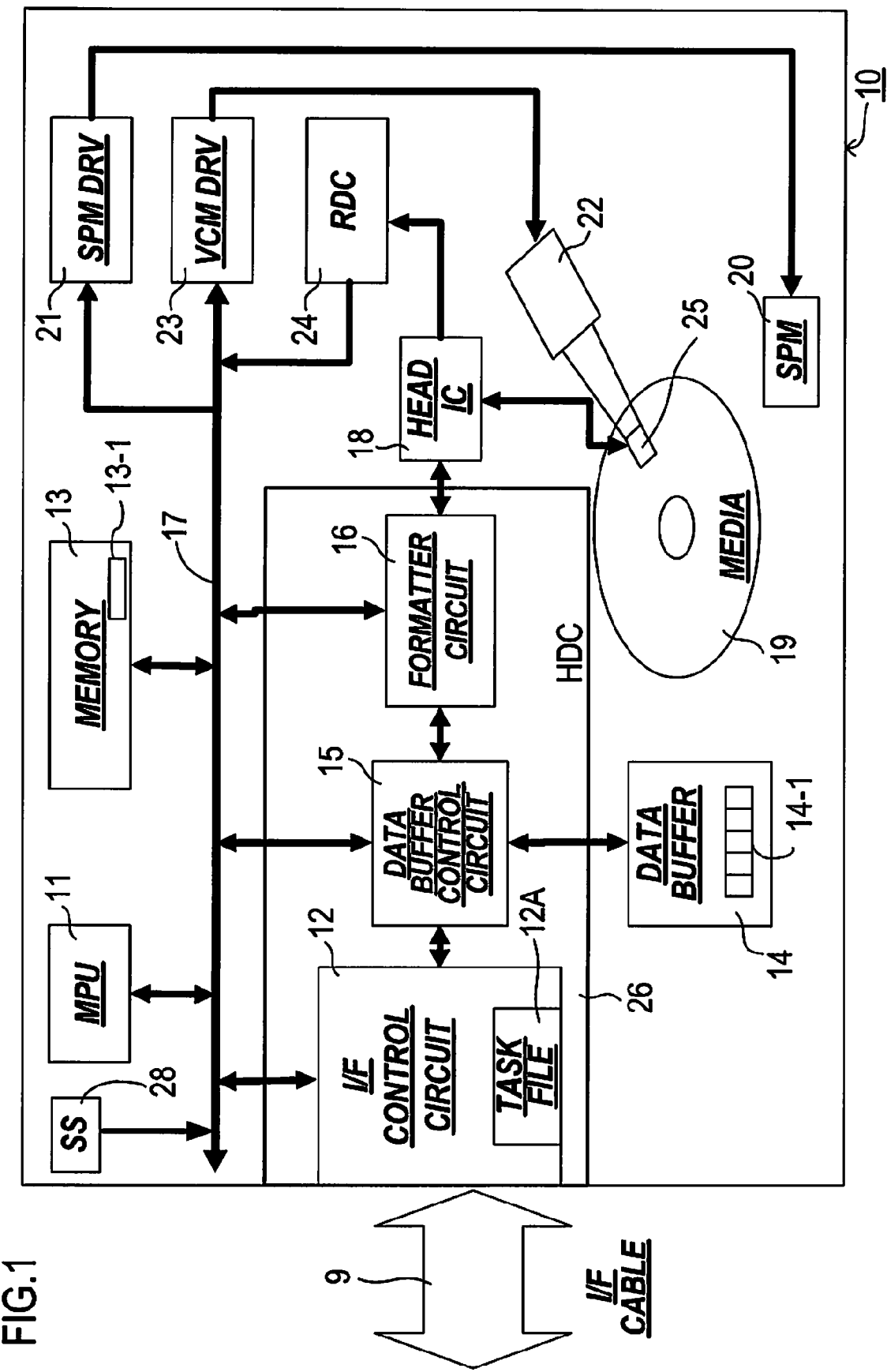
FIG. 1 is a block diagram depicting a data storage device according to an embodiment.
Figure 2:
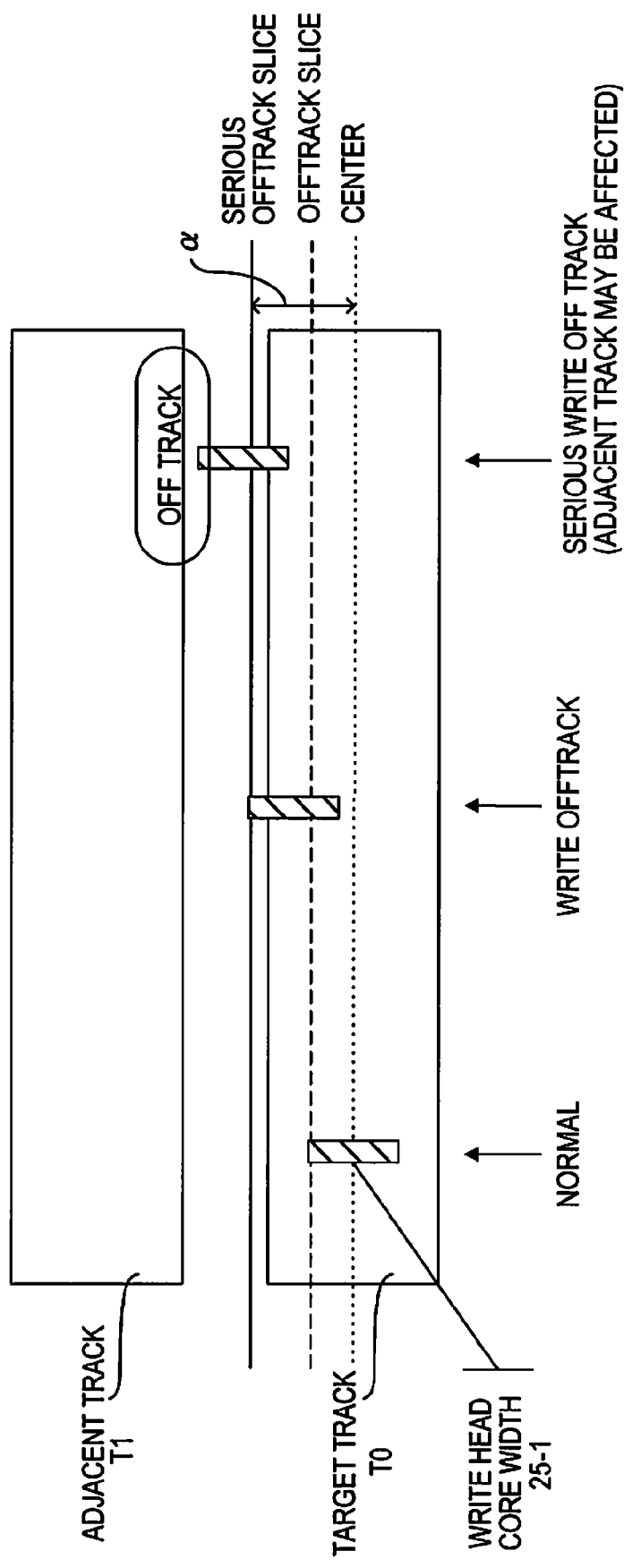
FIG. 2 is a diagram depicting off track and off track writing according to an embodiment.

FIG. 1 is a block diagram depicting a data storage device according to an embodiment of the present invention, and FIG. 2 is a diagram depicting off track detection. FIG. 1 shows a magnetic disk device (HDD) which reads/writes data from/to a magnetic disk as an example of a data storage device.

As indicated by FIG. 1, a magnetic disk device 10 is built in to a personal computer, and is connected with a host (not illustrated) of the personal computer via a cable 9 of such an interface as SCSI (Small Component Serial Interface) and the ATA (AT Attachment) standard.

The magnetic disk device 10 includes a magnetic disk 19, a spindle motor 20 which rotates the magnetic disk 19, a magnetic head 25 which reads/writes data from/to the magnetic disk 19, and an actuator (VCM) 22 which moves the magnetic head 25 in a radius direction (track crossing direction) of the magnetic disk 19.

As a control unit, the magnetic disk device 10 has an HDC (Hard Disk Controller) 26, a data buffer 14, MPU 11, a memory (RAM, ROM) 13, a read channel circuit (RDC) 24, a head IC 18, a spindle motor driver 21, a VCM driver 23, a shock sensor (vibration sensor) 28 and a bus 17 connecting these composing elements.

The HDC 26 has an interface control circuit 12 having a task file 12A for setting a task from the host, a data buffer control circuit 15 for controlling the data buffer 14, and a format conversion circuit 16 which converts the format of the record data and reversely converts the format of the read data. The read channel circuit 24 demodulates the read data, and generates a read gate, write gate, read clock and write clock.

The data buffer 14 plays a role of a cache memory, stores write data from the host in a cache area 14-1, and stores read data from the magnetic disk 19. During write back, the write data in the data buffer 14 are written to the magnetic disk 19, and the read data in the data buffer 14 are transferred to the host.

When writing, the head IC 18 supplies recording current to the magnetic head 25 according to the write data, and when reading, the head IC 18 amplifies the read signal from the magnetic head 25 and outputs it to the read channel circuit 16. The spindle driver 21 rotary-drives the spindle motor 20. The VCM driver 23 drives the VCM 22 which moves the magnetic head 25.

The MPU (Micro Processor Unit) 11 performs position detection and position control of the magnetic head 25, read/write control and retry control. The memory (ROM/RAM) 13 stores data required for processing of the MPU 11. The shock sensor 28 detects vibration and outputs the detected signal to the MPU 11 via the bus 17.

The MPU 11 detects the position of the head 25 based on the servo signal of the magnetic disk 19 from the head IC 18, performs seeking and on track control of the VCM 22, and detects off track based on the detected position. If off track is detected during writing, the MPU 11 judges it as a write error, and stops the generation of the write gate of the sector. The memory 13 stores a rewrite processing request table 13-1 which will be described in FIG. 4 and later.

FIG. 2 is a diagram depicting the off track detection according to an embodiment of the present invention. FIG. 2 indicates a state where a write element 25-1 of the magnetic head 25 is positioned on a target track T0 of the magnetic disk 19, and data is being written. When the write element 25-1 is positioned at a center of the target track T0, data can be written normally.

However even if the position of the write element 25-1 is controlled to be the center of the target track T0, the write element 25-1 may be shifted from the track center due to wind pressure and vibration on which the magnetic head 25 receives. To detect this, the MPU 11 sets an off track slice value, and detects write off track when the head position, which is the result of demodulating the servo signal from the magnetic head 25, exceeds the off track slice value. This off track slice value is set to a value with which the write element 25-1 can judge that data cannot be written to the target track T0 normally. When off track is detected, the MPU 11 executes write retry of the write data on this track T0.

The MPU 11 also sets a serious off track slice value which is greater than the off track slice value. This serious track slice value $\alpha$ is for judging that the data write by the write element may affect data on an adjacent track T1. If the head position, which is a result of demodulating the servo signal from the magnetic head 25, exceeds the serious off track slice value $\alpha$, the MPU 11 judges that the data write may affect the data on the adjacent track T1. In this case, the data on the adjacent track T1 is rewritten.

(First Embodiment of Rewrite Processing)

FIG. 3 is a flow chart depicting a first embodiment of write retry processing of the present invention, FIG. 4 indicates a rewrite processing request table 13-1 in FIG. 1 and FIG. 3, and FIG. 5 and FIG. 6 indicate a registration operation to the table in FIG. 4 according to the processing in FIG. 3.

The rewrite processing request table 13-1 will be described with reference to FIG. 4. As FIG. 4 shows, the rewrite processing request table 13-1 is for storing a rewrite processing request, and is comprised of an entry number, effective flag, track number and shift amount. The effective flag is set to valid when rewrite processing has not been completed, and is set to invalid when rewrite processing has been completed. The track number is a track to be rewritten (in other words, an adjacent track number when it is judged that the above mentioned head position exceeds the serious off track slice value $\alpha$ and may affect the data on the adjacent track T1). The shift amount is a distance from the track center to the head position (shift) when it is judged that the data on the adjacent track is affected.

According to the present patent application, when such a rewrite request is generated, the rewrite request is registered in this processing table 13-1, and the rewrite request in the processing table 13-1 is executed at an arbitrary timing which is different from the write retry.

Now the write retry processing in FIG. 3 will be described with reference to FIG. 5 and FIG. 6.

(S10) If the head position exceeds the off track slice value as indicted in FIG. 2, the MPU 11 detects the write off track, acquires the shift amount $\Delta$new of the head 25 from the track center at this time, and judges whether the shift amount $\Delta$new is more than the serious off track slice value $\alpha$ in FIG. 2. If the shift amount $\Delta$new is not more than the serious off track slice value $\alpha$ in FIG. 2, then the MPU 11 judges that the adjacent track is not affected, and normal write retry in step 22 is executed.

(S12) If the shift amount Δnew is more than the serious off track slice value α in FIG. 2, on the other hand, the MPU 11 judges that the adjacent track may be affected, and starts registration processing to the processing table 13-1. First the MPU 11 checks the effective flags to judge whether the current entries of the processing table 13-1 are all valid.

(S14) If it is judged that all the current entries of the processing table 13-1 are not valid (partially or all invalid), the MPU 11 selects one of the invalid entries as a registration entry, as indicated in FIG. 5. And processing moves to step S20.

(S16) If the MPU 11 judges that all the current entries of the processing table 13-1 are valid, the processing table 13-1 is in the state indicated in FIG. 6. In this state, a new entry cannot be registered. Therefore the MPU 11 compares the shift amount Δ1 to ΔM of all the entries of the processing table 13-1 and the current shift amount Δnew. And the MPU 11 judges whether the current shift amount Δnew of the new entry is the lowest. If it is judged that the current shift amount Δnew is the lowest in the comparison of the shift amounts Δ1 to ΔM of all the entries of the processing table 13-1 and the current shift amount Δnew, the MPU 11 executes normal write retry in step S22 without registering the current shift amount Δnew in the processing table 13-1. In this case, the current rewrite request, generated when it was judged that the adjacent track may be affected, is not executed.

(S18) If it is judged that the current shift amount Δnew is not the lowest in the comparison of the shift amounts Δ1 to ΔM of all the entries of the processing table 13-1 and the current shift amount Δnew, the MPU 11 selects an entry of which shift amount is the lowest in the processing table 13-1 as a registration entry.

(S20) As FIG. 5 and FIG. 6 indicates, the MPU 11 overwrites the rewrite target track number Nnew in the registration entry selected in step S14 or step S18, and overwrites Δnew in the shift amount. Then the effective flag of the registration entry of the processing table 13-1 is set to valid.

(S22) The MPU 11 executes the write retry of the track for which off track was detected. In other words, the MPU 11 reads the write data again from the cache memory 14-1, and writes the data on the track.

In this way, when write retry is executed when off track is detected, rewrite of the adjacent track is not executed along with the write retry, even if the adjacent track may be affected, but the rewrite request is stored in the processing table 13-1. Then as mentioned later, the write back processing of the adjacent track is executed referring to the processing table 13-1 at an arbitrary timing.

Entry of the lowest shift amount is removed from the processing table 13-1 because the case of a small shift amount is a case when data can be read by an offset read of the adjacent track, even if the adjacent track may be affected, so the entry which is more seriously affected is stored rather than this entry.

Figure 7:
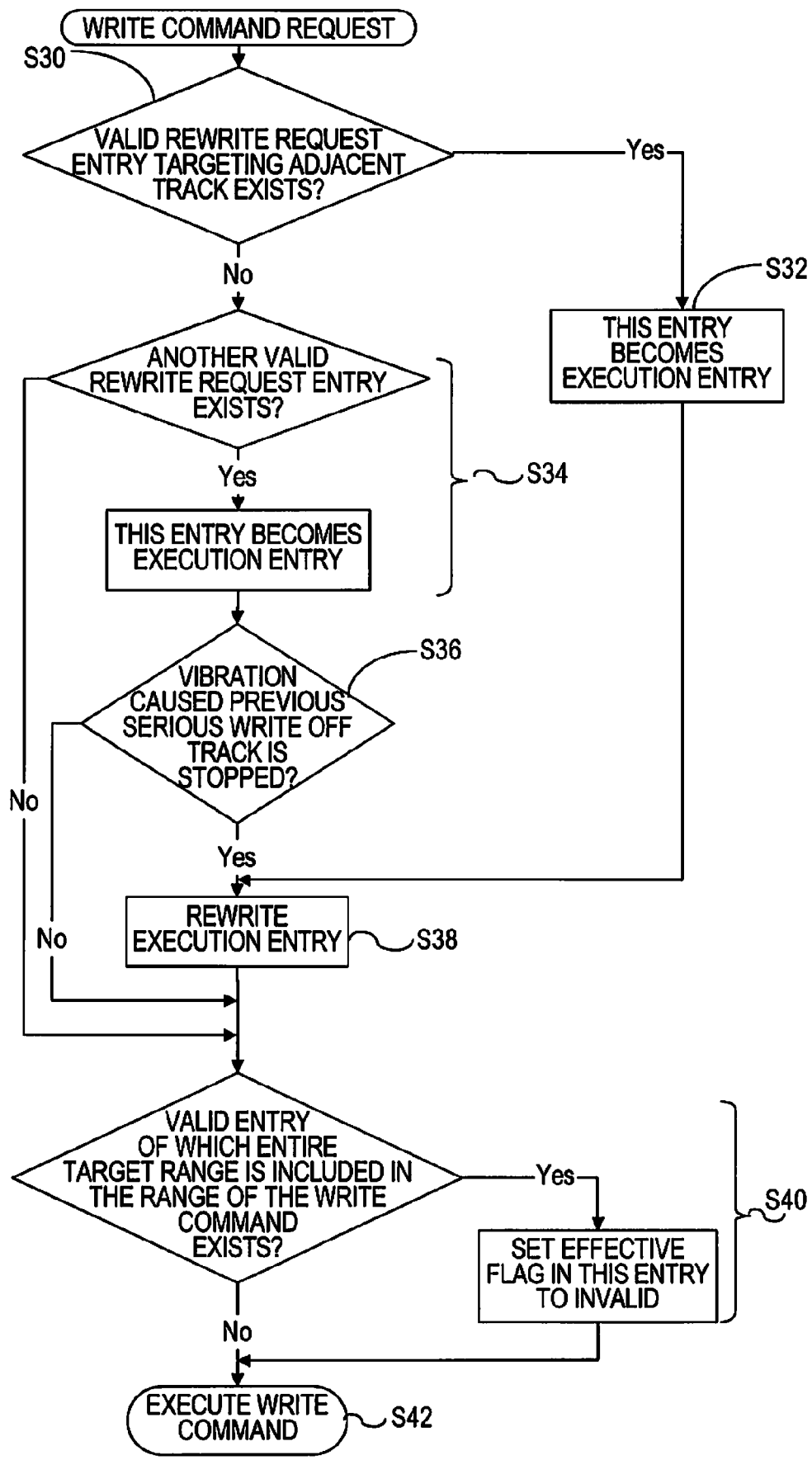
FIG. 7 is a flowchart depicting the first embodiment of a rewrite processing.

Now a write command processing using this processing table 13-1 will be described with reference to FIG. 7.

(S30) When a write command is received, the MPU 11 executes the write back processing before processing this command. In other words, the MPU 11 judges whether a valid rewrite request entry, targeting the adjacent track of the track area specified by the write command, exists in the processing table 13-1. This means that the MPU 11 compares the write track number specified by the write command and a track number of each entry of the processing table 13-1, and judges whether a valid rewrite request entry, targeting the adjacent track of the track area specified by the write command, exists.

(S32) If it is judged that a valid rewrite request command, targeting the adjacent track of the track area specified by the write command, exists in the processing table 13-1, the MPU 11 selects this entry as the execution entry, and processing moves to step S38.

(S34) If it is judged that a valid rewrite request entry targeting the adjacent track of the track area specified by the write command does not exist in the processing table 13-1, on the other hand, the MPU 11 judges whether a valid rewrite request entry exists in the processing table 13-1. If not, processing moves to step S40. If it exists, the MPU 11 selects this entry as the execution entry.

(S36) The MPU 11 judges whether vibration which caused the previous serious write off track is stopped based on the output of the shock sensor 28. If the MPU 11 judged that a vibration which caused the previous serious write off track is not stopped, processing moves to step S40.

(S38) If it is judged that a vibration which caused the previous serious write off track is stopped, on the other hand, the MPU 11 executes the write back processing of the selected execution entry. For example, the MPU 11 reads the data on the adjacent track, and writes the read back data on the adjacent track.

(S40) Then the MPU 11 judges whether a valid rewrite request, which includes the entire target range, exists in the write range specified by the write command in the processing table 13-1. In other words, the MPU 11 compares the write track number specified by the write command and a track number of each entry in the processing table 13-1, and judges whether a valid rewrite request entry, which includes the entire target range, exists in the write range specified by the write command. If it exists, the effective flag of this entry is changed to invalid, since the entry area is overwritten by the data of this write command. In other words, the effective flag is set to invalid since rewrite is unnecessary.

(S42) The MPU 11 executes the write command. In other words, the MPU 11 writes the write data on the track specified by the write command.

In this way, by synchronizing another write command which is different from the retried write command, the adjacent track of the track area specified by the write command is rewritten, and the write command is executed. Because of the adjacent track, influence on the execution time of the write command is small.

The effective entry is also rewritten after vibration stops, so rewriting in a state where vibration continues can be prevented. Also the rewrite area included in the write command is not separately rewritten, but the adjacent track is overwritten together by execution of the write command, so influence on the execution of the write command can be prevented.

(Second Embodiment of Rewrite Processing)

Figure 8:
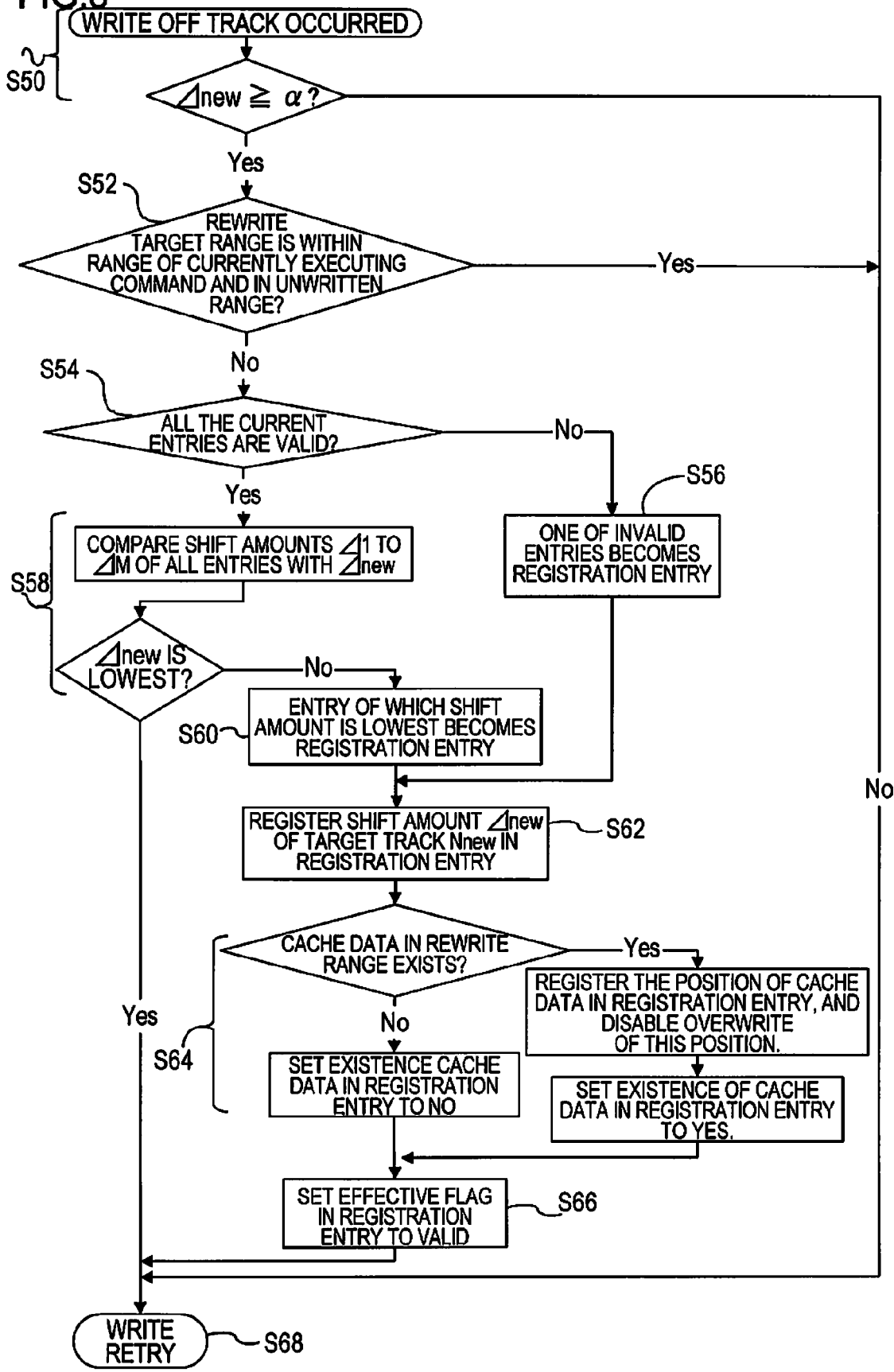
FIG. 8 is a flow chart depicting the second embodiment of the write retry processing.

FIG. 8 is a flow chart depicting the second embodiment of the write retry processing, FIG. 9 indicates the rewrite processing request table 13-1A in FIG. 1 and FIG. 8, and FIG. 10 and FIG. 11 indicate the registration operation to the table in FIG. 9 according to the processing in FIG. 8. The second embodiment is added a function to execute rewrite processing in the background when the write command does not arrive, and a function to process the write back data remaining in the cache memory with priority so as to effectively use the cache memory, to the first embodiment.

The rewrite processing request table 13-1A will be described with reference to FIG. 9. As FIG. 9 indicates, rewrite processing request tables 13-1A is for storing the rewrite processing request, and is comprised of an entry number, effective flag, track number, shift amount, existence of cache data and position (address) of cache data. The effective flag, track number and shift amount are the same as those described in the first embodiment. The existence of cache data shows whether data on the track to be rewritten exists in the cache memory 14-1 in the buffer 14. The position of the cache data shows the position (address) of the data in the cache memory 14-1 when the cache data exists.

The present patent application is for registering the rewrite request in the processing table 13-1 in advance when the rewrite request is generated, and executing the rewrite request in the processing table 13-1 at an arbitrary timing which is different from the write retry.

The write retry processing in FIG. 8 will now be described with reference to FIG. 10 and FIG. 11.

(S50) If the head position exceeds the off track slice value as shown in FIG. 2, the MPU 11 detects the write off track, acquires the shift amount Δnew of the head 25 from the track center position at this time, and judges whether the shift amount Δnew is more than the serious off track slice value α in FIG. 2. If the shift amount Δnew is not more than the serious off track slice value α in FIG. 2, then the MPU 11 judges that the adjacent track is not affected, and executes the normal write retry in step S68.

(S52) If the shift amount Δnew is more than the serious off track slice value α in FIG. 2, on the other hand, the MPU 11 judges that the adjacent track may be affected, and moves to registration processing in the processing table 13-1. First the MPU 11 judges whether this rewrite range is within the target range of the command currently being executed (during execution of the write command which generated a write off track), or in an area which has not yet been written. If it is judged that the rewrite range is within the target range of the command currently being executed (during execution of the write command which generated a write off track), or in an area which has not yet been written, the MPU 11 executes normal write retry in step S68 since rewrite is unnecessary.

(S54) If it is judged that the rewrite range is not within the target range of the command currently being executed (during execution of the write command which generated a write off track), or not in an area which has not yet been written, the MPU 11 checks the effective flags to judge whether all the current entries of the processing table 13-1A are valid.

(S56) If it is judged that all the current entries of the processing table 13-1A are not valid (partially or all invalid), the MPU 11 selects one of the invalid entries as a registration entry, as indicated in FIG. 10, and processing moves to step S62.

Figure 11:
FIG. 11 shows the registration operation of a rewrite request registration processing in FIG. 8 when the rewrite request table in FIG. 9 is full.

(S58) If the MPU 11 judges that all the current entries of the processing table 13-1A are valid, the processing table 13-1A is in the state indicated in FIG. 11. In this state, a new entry cannot be registered. Therefore the MPU 11 compares the shift amounts Δ1 to ΔM of all the entries of the processing table 13-1A and the current shift amount Δnew. And the MPU 11 judges whether the current shift amount Δnew is the lowest in this comparison. If it is judged that the current shift amount Δnew is the lowest in the comparison of the shift amounts Δ1 to ΔM of all the entries of the processing table 13-1A and the current shift amount Δnew, the MPU 11 executes the normal write retry in step S68 without registering the current shift amount Δnew in the processing table 13-1A. In this case, the current rewrite request generated when it was judged that the adjacent track may be affected is not executed.

(S60) If it is judged that the current shift amount Δnew is not the lowest in the comparison of the shift amounts Δ1 to ΔM of all the entries of the processing table 13-1A and the current shift amount Δnew, the MPU 11 selects an entry of which shift amount is the lowest in the processing table 13-1A as a registration entry.

(S62) As FIG. 10 and FIG. 11 indicates, the MPU 11 overwrites the rewrite target track number Nnew in the registration entry selected in steps S56 or S60, and overwrites Δnew in the shift amount.

(S64) The MPU 11 inquires of the buffer control circuit 15, which manages the area of the buffer memory 14, whether the data in this rewrite request target range exists in the cache memory 14-1 of the buffer memory 14. If it exists, the MPU 11 registers the position of the cache memory 14-1 in the registration entry of the processing table 13-1A in the position of the cache memory of the table. Also the MPU 11 sets the overwrite of this data of the cache memory 14-1 to be disabled (write protected). The MPU 11 also sets the existence of the cache data in the registration entry of the processing table 13-1A to YES. If the data in the rewrite request target range does not exist in the cache memory 14-1, on the other hand, the MPU 11 sets the existence of the cache data in the registration entry of the processing table 13-1A to NO.

(S66) Then the MPU 11 sets the effective flag of the registration entry of the processing table 13-1A to valid.

(S68) The MPU 11 executes the write retry of the track for which off track was detected. In other words, the MPU 11 reads the write data again from the cache memory 14-1 and writes the data on the track.

In this way, when write retry is executed when off track is detected, rewrite of the adjacent track is not executed along with the write retry, even if the adjacent track may be affected, but the write request is stored in the processing table 13-1A. Then as mentioned later, the write back processing of the adjacent track is executed referring to the processing table 13-1A at an arbitrary timing.

The entry of the lowest shift amount is removed from the processing table 13-1 because the case of a small shift amount is a case when data can be read by an offset read of the adjacent track, even if the adjacent tracks may be affected, so the entry which is more seriously affected is stored rather than this entry.

The rewrite request in the retry range, which can be executed by retry, is not registered in the table. Whether data exists in the cache memory or not is checked in advance.

Now a write command processing using this processing table 13-1A will be described with reference to FIG. 12 and FIG. 13.

(S70) When an entry of a valid rewrite processing request exists in the processing table 13-1A, the MPU 11 starts this processing.

(S72) First the MPU 11 judges whether a write command is received.

(S74) If it is judged that a write command is not received, the MPU 11 judges whether another command (e.g. read, diagnosis) is received. If another command is received, the MPU 11 executes this request command, and processing returns to step S72.

(S76) If it is judged that another command is not received either, the MPU 11 executes the rewrite processing in the background. In other words, the MPU 11 judges whether vibration which caused the previous serious write off track is stopped based on the output of the shock sensor 28. If the MPU 11 judges that the vibration which caused the previous serious write off track is not stopped, processing moves to step S72.

(S78) If it is judged that the vibration which caused the previous serious write off track is stopped, on the other hand, the MPU 11 judges whether a valid entry with cache data exists, referring to the processing table 13-1A. If a valid entry with cache data does not exist, the MPU 11 selects an arbitrary entry from the valid entries, and executes the write back processing. For example, the MPU 11 reads data on the adjacent track, and writes the read data back on the adjacent track. If a valid entry with cache data exists, on the other hand, the MPU 11 executes the rewrite processing of the valid entry. In other words, the MPU 11 acquires a position of the cache data from the processing table 13-1A, reads the cache data in the position of the cache memory 14-1, and rewrites the data on the track specified in the processing table 13-1A.

(S80) If it is judged that a write command has been received in step S72, on the other hand, the MPU 11 executes write back processing before processing this command. In other words, the MPU 11 judges whether a valid rewrite request entry, targeting the adjacent track of the track area specified by the write command, exists in the processing table 13-1A. This means that the MPU 11 compares the write track number specified by the write command and a track number of each entry of the processing table 13-1A, and judges whether a valid rewrite request entry, targeting the adjacent track of the track area specified by the write command, exists.

If it is judged that a valid rewrite request entry, targeting the adjacent track of the track area specified by the write command, exists in the processing table 13-1A, the MPU 11 executes the write back processing (see FIG. 13) of this entry, and processing moves to step S82. If it is judged that a valid rewrite request entry, targeting the adjacent track of the track area specified by the write command, does not exist in the processing table 13-1A, the MPU 11 moves to step S82 without executing the rewrite processing.

(S82) Then the MPU 11 judges whether a valid rewrite request entry, of which entire target range is included in the write range specified by the write command, exists in the processing table 13-1A. In other words, the MPU 11 compares the write track number specified by the write command and a track number of each entry of the processing table 13-1A, and judges whether a valid rewrite request entry, of which entire target range is included in the write range specified by the write command, exists. If it exists, the effective flag is changed to invalid, since this entry area is overwritten by the data of this write command. In other words, the effective flag is set to invalid since rewrite is unnecessary.

(S84) The MPU 11 executes the write command. In other words, the write data is written on the track specified by the write command.

(S86) The MPU 11 judges whether a valid rewrite processing request remains with reference to the processing table 13-1A. If a valid rewrite processing request remains, the processing returns to step S72, and if not, the MPU 11 ends this processing.

The rewrite processing in FIG. 12 will now be described with reference to FIG. 13.

(S90) The MPU 11 judges whether the entry is a valid entry with cache data, with reference to the processing table 13-1A.

(S92) If the entry is a valid entry with cache data, the MPU 11 acquires a position of the cache data from the processing table 13-1A, reads the cache data in this position of the cache memory 14-1, and rewrites the data on the track specified in the processing table 13-1A. Then the MPU 11 sets the overwrite of this cache position of the cache memory 14-1 to enable (write unprotected).

(S94) If the entry is not a valid entry with cache data, the MPU 11 reads data on the adjacent track of the rewrite target, and writes the read data back on the adjacent track.

(S96) Then the MPU 11 sets this entry of the processing table 13-1A to invalid. And rewrite processing ends.

Figure 12:
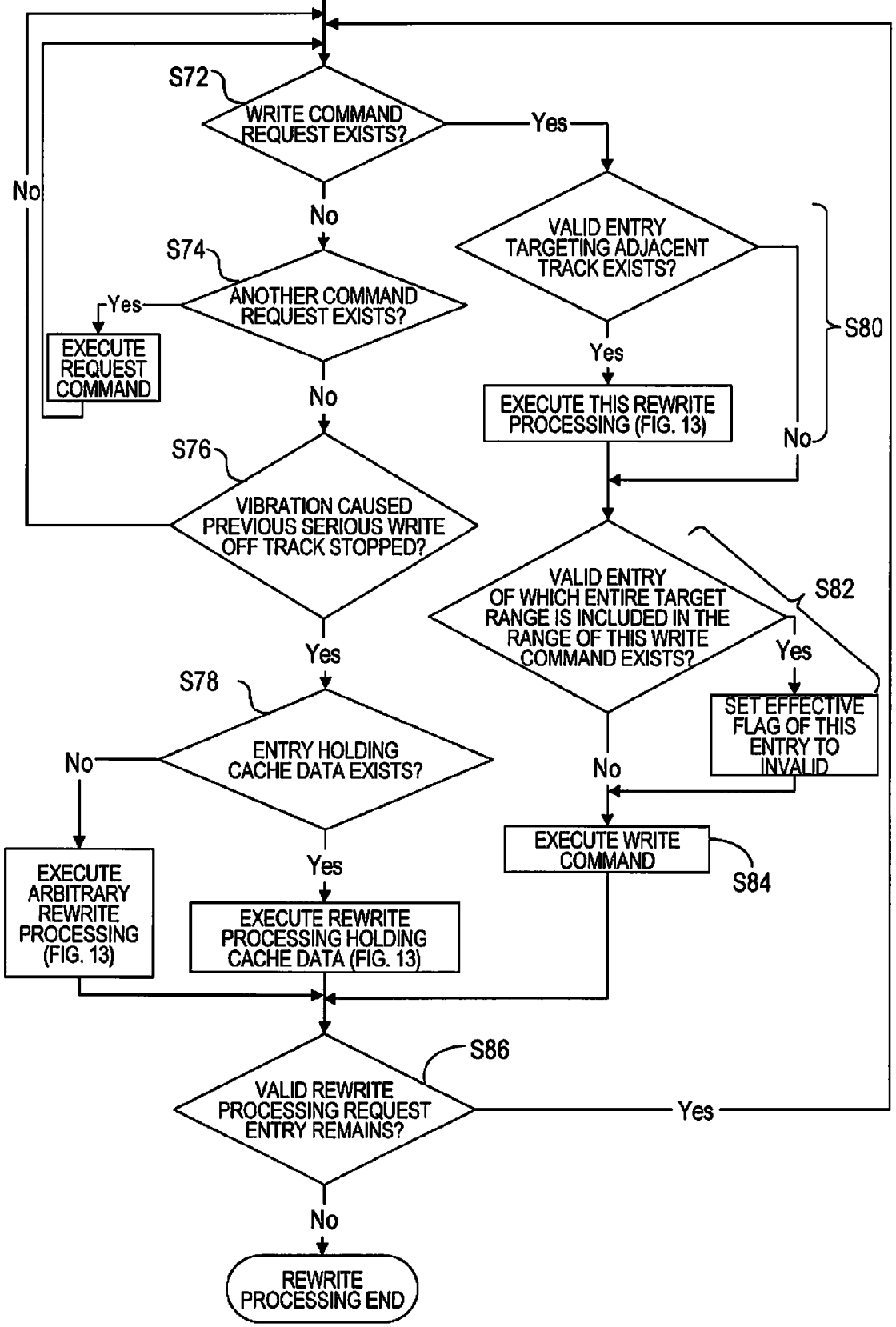
FIG. 12 is a flow chart depicting the second embodiment of a rewrite processing.
Figure 13:
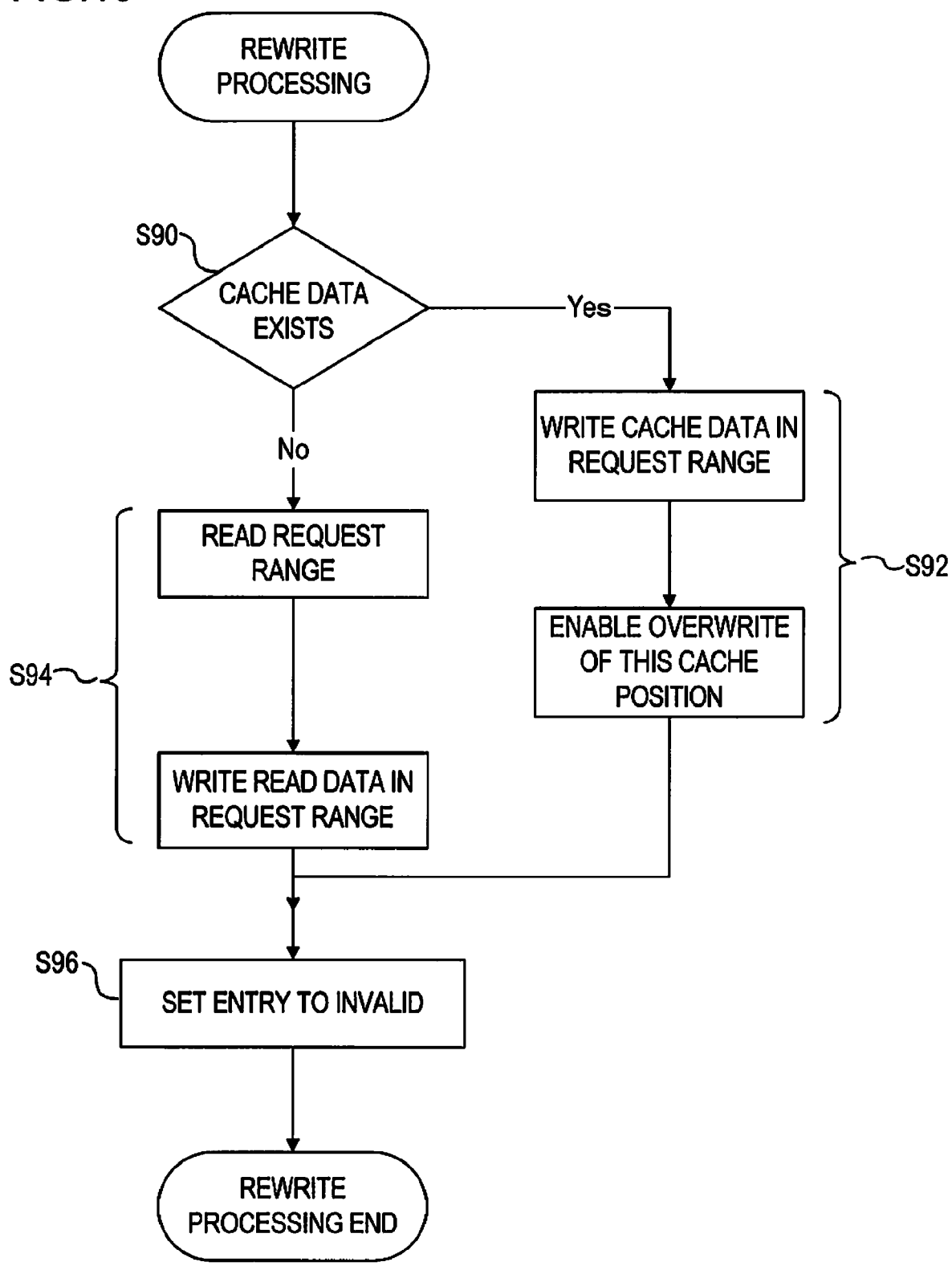
FIG. 13 is a flow chart depicting the rewrite processing of FIG. 12.

In the rewrite processing in FIG. 13, judgment in step S90 is performed in order to perform both rewrite processing in step S78 and rewrite processing in step S80 in FIG. 12. However for the rewrite processing in step S78, processing which is actually executed is either one of the rewrite processings in FIG. 13.

In this way, by synchronizing with another command which is different from a retried write command, the adjacent track of the track area specified by the write command is rewritten, and the write command is executed. Because of the adjacent track, influence on the execution time of the write command is small. The rewrite area included in the write command is not separately rewritten, but the adjacent track is overwritten by execution of the write command, so influence on the execution of the write command can be prevented.

An effective entry is rewritten in the background where a command does not arrive, after vibration is stopped, so rewrite in a state in which vibration is continuing can be prevented. When a cache data is used for rewrite processing, the cache data is held until this rewrite processing is executed, so the cache area that can be used is decreased and fragmented. Therefore the rewrite processing using cache data is executed with priority compared with the rewrite processing that is not using cache data, so as to use cache memory effectively.

When write processing is executed to an adjacent cylinder of a cylinder in which a rewrite processing request is registered, the rewrite processing is executed before this write processing is executed, so that an adjacent cylinder may not be further affected by off track writing.

Other Embodiments

In the above embodiments, the data storage device is described using a magnetic disk device, but the present invention can also be applied to a storage device using an optical disk, magneto-optical disk or other storage media in which data is written in sector units. The interface is not limited to ATA, but can also be applied to other interfaces.

The present invention was described using the embodiments, but the present invention can be modified in various ways within a scope of the spirit of the present invention, and these variant forms shall not be excluded from the scope of the present invention.

When an off track error, which affects data on an adjacent track, is generated by a write command, rewrite processing of this write command is not executed immediately, but a rewrite request including information on the track to be rewritten and the shift amount of the off track is held, and the rewrite request being held is executed at a timing which is different from the write retry. So rewrite processing can be executed after vibration, which caused the off track, stops, and the generation of an off track error during rewrite processing and the generation of further off track writing can be prevented, and by executing the rewrite processing in the background, an extension of the execution time of this write command can be decreased, and a drop in performance of the drive, due to the rewrite processing, can be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

The invention claimed is:

1. A data storage device, comprising:
    a head which reads and writes data on a rotating storage medium;
    an actuator that positions the head on a desired track of the storage medium;
    a control circuit which receives a write command and write data from a host, writes the write data on a specified track of the storage medium using the head, detects off track that the head is shifted a predetermined amount from the track, when the head is writing data on the track, and executes write retry of the write data on the track; and
    a rewrite request table which stores a rewrite request having at least a target track number and a shift amount of the head at the off track,
    wherein the control circuit, when the off track is detected, judges whether the shift amount is more than a predetermined threshold value to judge whether there is a possibility that data on an adjacent track is affected by off track of the head, stores a rewrite request for the adjacent track in the rewrite request table if it is judged that there is a possibility that the data on the adjacent track is affected, and executes the rewrite request stored in the rewrite request table at an arbitrary timing which is different from the write retry based on the shift amount.

2. The data storage device according to claim 1, wherein when the control circuit receives other write command, the control circuit executes the rewrite request stored in the rewrite request table before executing the other write command.

3. The data storage device according to claim 2, wherein when the other write command is received, the control circuit judges whether the rewrite request for a track adjacent to the track specified by the other write command exists in the rewrite request table, and executes the rewrite request for the adjacent track if the rewrite request for the adjacent track exists, and judges whether a vibration which causes the off track is stopped if the rewrite request for the adjacent track does not exist, and executes a rewrite request for a track other than the adjacent track stored in the rewrite request table if it is judged that the vibration is stopped.

4. The data storage device according to claim 1, wherein the control circuit judges whether a vibration which causes the off track is stopped, and executes the rewrite request stored in the rewrite request table when it is judged that the vibration is stopped.

5. The data storage device according to claim 1, wherein when another write command is received, the control circuit judges whether a rewrite area of the rewrite request in the rewrite request table is within a write range of the other write command, and resets the rewrite request stored in the rewrite request table when it is judged that the rewrite area of the rewrite request is within the write range of the other write command.

6. The data storage device according to claim 1, wherein the rewrite request table stores a plurality of rewrite requests each of which has at least a target track number and a shift amount of the head at the off track,
    and if it is judged that there is a possibility that data on the adjacent track is affected, the control circuit compares the shift amount of the head of the rewrite request for the adjacent track and the shift amounts of the rewrite requests stored in the rewrite request table, and deletes the rewrite request of which the shift amount is the lowest from the rewrite request table.

7. The data storage device according to claim 1, wherein when it is judged that there is a possibility that the data on the adjacent track is affected, the control circuit judges whether the adjacent track is within a target range of the write command which generates the off track, and disables storing the rewrite request for the adjacent track in the rewrite request table when it is judged that the adjacent track is within the target range of the write command.

8. The data storage device according to claim 1, wherein the control circuit judges whether the write command is received, and executes the rewrite request stored in the rewrite request table if the write command is not received.

9. The data storage device according to claim 1, further comprising a cache memory that temporarily stores the write data,
    wherein the control circuit judges whether the target data of the rewrite request of the rewrite request table exists in the cache memory, and executes the rewrite request by writing the target data in the cache memory on the adjacent track if the target data of the rewrite request exists in the cache memory.

10. The data storage device according to claim 9, wherein when it is judged that there is a possibility that the data on the adjacent track is affected, the control circuit judges whether the data on the adjacent track exists in the cache memory, and if judging that the data exists in the cache memory, the control circuit attaches an identifier existing in the cache memory to the rewrite request, stores the rewrite request in the rewrite request table, and executes the rewrite request having the identifier existing in the cache memory, which is stored in the rewrite request table, with priority at a timing which is different from the write retry.

11. An adjacent track rewrite processing method for a data storage device which positions a head for reading and writing data on a desired track of a rotating storage medium and reads and writes the data, comprising:
    detecting off track that the head is shifted a predetermined amount from the track, when the head is writing data on the track;
    judging whether a shift amount of the head at the off track is more than a predetermined threshold value to judge whether there is a possibility that data on an adjacent track is affected by off track of the head when the off track is detected;
    storing a rewrite request for the adjacent track in a rewrite request table if it is judged that there is a possibility that the data on the adjacent track is affected, the rewrite request having at least a target track number and the shift amount of the head;
    executing write retry of the write data on the track; and
    executing the rewrite request stored in the rewrite request table at an arbitrary timing which is different from the write retry based on the shift amount.

12. The adjacent track rewrite processing method according to claim 11, wherein the executing the rewrite request comprises:
    executing, when the other write command is received, the rewrite request stored in the rewrite request table before executing the other write command.

13. The adjacent track rewrite processing method according to claim 12, wherein the executing the rewrite request further comprises:

judging whether the rewrite request for a track adjacent to the track specified by the write command exists in the rewrite request table when the other write command is received;

executing the rewrite request for the adjacent track if the rewrite request for the adjacent track exists;

judging whether a vibration which causes the off track is stopped if the rewrite request for the adjacent track does not exist; and executing a rewrite request for a track other than the adjacent track stored in the rewrite request table if it is judged that the vibration is stopped.

14. The adjacent track rewrite processing method according to claim 11, wherein executing the rewrite request further comprises:

judging whether a vibration which causes the off track is stopped; and executing the rewrite request stored in the rewrite request table when it is judged that the vibration is stopped.

15. The adjacent track rewrite processing method according to claim 11, wherein the executing the rewrite request further comprises:

judging whether a rewrite area of the rewrite request in the rewrite request table is within a write range of another write command when the other write command is received; and resetting the rewrite request stored in the rewrite request table when it is judged that the rewrite area of the rewrite request is within the write range of the other write command.

16. The adjacent track rewrite processing method according to claim 11, wherein the storing comprises:

comparing the shift amount of the head of the rewrite request for the adjacent track and the shift amounts of the rewrite requests stored in the rewrite request table if it is judged that there is a possibility that data on the adjacent track is affected; and deleting the rewrite request of which the shift amount is the lowest from the rewrite request table.

17. The adjacent track rewrite processing method according to claim 11, wherein the storing further comprises:

judging whether the adjacent track is within a target range of the write command which generates the off track if it is judged that there is a possibility that the data on the adjacent track is affected; and disabling storing the rewrite request for the adjacent track in the rewrite request table when it is judged that the adjacent track is within the target range of the write command.

18. The adjacent track rewrite processing method according to claim 11, wherein the executing the rewrite request further comprises:

judging whether the write command is received, and a step of executing the rewrite request stored in the rewrite request table if the write command is not received.

19. The adjacent track rewrite processing method according to claim 11, wherein the executing the rewrite request further comprises:

judging whether the target data of the rewrite request of the rewrite request table exists in a cache memory which temporarily stores the write data; and executing the rewrite request by writing the target data in the cache memory on the adjacent track if the target data of the rewrite request exists in the cache memory.

20. The adjacent track rewrite processing method according to claim 19, wherein the storing further comprises;

judging whether the data on the adjacent track exists in the cache memory if it is judged that there is a possibility that the data on the adjacent track is affected; and attaching an identifier existing in the cache memory to the rewrite request and storing the rewrite request in the rewrite request table if the data on the adjacent track exists in the cache memory, and wherein the executing the rewrite request further comprises:

executing the rewrite request having the identifier existing in the cache memory, which is stored in the rewrite request table, with priority at a timing which is different from the write retry.

* * * * *